US012570057B2

United States Patent

Tazawa et al.

(12) United States Patent
(10) Patent No.: US 12,570,057 B2
(45) Date of Patent: Mar. 10, 2026

(54) METHOD OF PRODUCING NONLINEAR OPTICAL DEVICE

(71) Applicants: NATIONAL INSTITUTE OF INFORMATION AND COMMUNICATIONS TECHNOLOGY, Koganei (JP); SUMITOMO ELECTRIC INDUSTRIES, LTD., Osaka (JP)

(72) Inventors: Hidehisa Tazawa, Osaka (JP); Yasunori Murakami, Osaka (JP); Akira Otomo, Koganei (JP); Toshiki Yamada, Koganei (JP); Hideo Yokohama, Koganei (JP); Rieko Ueda, Koganei (JP)

(73) Assignees: NATIONAL INSTITUTE OF INFORMATION AND COMMUNICATIONS TECHNOLOGY, Tokyo (JP); SUMITOMO ELECTRIC INDUSTRIES, LTD., Osaka (JP)

(*) Notice: Subject to any disclaimer, the term of this patent is extended or adjusted under 35 U.S.C. 154(b) by 565 days.

(21) Appl. No.: 18/015,467

(22) PCT Filed: Jul. 14, 2021

(86) PCT No.: PCT/JP2021/026467

§ 371 (c)(1),
(2) Date: Jan. 10, 2023

(87) PCT Pub. No.: WO2022/024761

PCT Pub. Date: Feb. 3, 2022

(65) Prior Publication Data

US 2023/0330955 A1 Oct. 19, 2023

(30) Foreign Application Priority Data

Jul. 31, 2020 (JP) ................................ 2020-130371

(51) Int. Cl.

*B29D 11/00* (2006.01)
*G02F 1/361* (2006.01)
*B29K 105/00* (2006.01)

(52) U.S. Cl.

CPC ........ *B29D 11/0073* (2013.01); *G02F 1/3615* (2013.01); *B29K 2105/0073* (2013.01)

(58) Field of Classification Search

CPC ..... G02F 1/3617; G02F 1/3616; G02F 1/3615
See application file for complete search history.

(56) References Cited

U.S. PATENT DOCUMENTS 5,155,793 A * 10/1992 Esselin .................. G02F 1/065 385/145
6,106,743 A * 8/2000 Fan ....................... G02B 5/201 252/582

(Continued)

FOREIGN PATENT DOCUMENTS

CN 1819268 A * 8/2006 .......... H10D 86/441
CN 1890788 A * 1/2007

(Continued)

OTHER PUBLICATIONS

Machine translation of CN-1819268-A (Year: 2025).*

(Continued)

*Primary Examiner* — Emmanuel S Luk
(74) *Attorney, Agent, or Firm* — Oliff PLC

(57) ABSTRACT

A method of producing a nonlinear optical device is provided. In a surface of a semiconductor substrate, a recessed part is formed. In an environment under reduced pressure, the first liquid material is filled into the recessed part. A second liquid material is brought into contact with a first liquid material filled in the recessed part, and thereby a third liquid material is prepared. The third liquid material is solidified, and thereby an embedded portion is formed. The first liquid material includes a first solute and a first solvent, (Continued)

or the first liquid material consists of the first solvent. The second liquid material includes a second solute and a second solvent. The second solute includes a nonlinear optical polymer. The concentration of the second solute in the second liquid material is higher than the concentration of the first solute in the first liquid material.

10 Claims, 18 Drawing Sheets

(56) References Cited

U.S. PATENT DOCUMENTS

| | | | |
|---|---|---|---|
| 2003/0185532 | A1 | 10/2003 | Hosomi et al. |
| 2007/0086718 | A1 | 4/2007 | Aoki et al. |
| 2009/0318725 | A1 | 12/2009 | Takeuchi |
| 2013/0026674 | A1 | 1/2013 | Wakamatsu et al. |
| 2014/0199038 | A1 | 7/2014 | Yokoyama et al. |

FOREIGN PATENT DOCUMENTS

| | | | |
|---|---|---|---|
| JP | 2003-295143 | A | 10/2003 |
| JP | 2004-071934 | A | 3/2004 |
| JP | 2004-103817 | A | 4/2004 |
| JP | 2007-108515 | A | 4/2007 |
| JP | 2007-509769 | A | 4/2007 |
| JP | 2007-311235 | A | 11/2007 |
| JP | 2008-024832 | A | 2/2008 |
| JP | 2010-281862 | A | 12/2010 |
| JP | 2011-210942 | A | 10/2011 |
| JP | 2014-099525 | A | 5/2014 |
| WO | 2005/033797 | A2 | 4/2005 |

OTHER PUBLICATIONS

Machine translation of CN-1890788-A (Year: 2025).*

Hiroshima, Hiroshi et al., "Control of Bubble Defects in UV Nanoimprint.", Japanese Journal Applied Physics, (2007), vol. 46, pp. 6391-6394.

Nakadai, Masahiro et al., "Design of double-slotted high-Q photonic crystal nanocavity filled with electro-optic polymer.", 21st OptoElectronics and Communications Conference (OECC); (2016).

Yan, Chongoing et al., "Dynamic modulation of wideband slow light with continuous group index in polymer-filled photonic crystal waveguide.", Applied Optics, (2017), vol. 56, No. 35, pp. 9749-9756.

* cited by examiner

| | CROSS-SECTIONAL SEM IMAGE | VOID RATIO | PROPAGATION LOSS | LIGHT OUTPUT (RELATIVE VALUE) |
|---|---|---|---|---|
| No. 1 |  | 0% | 1.44dB/mm | 48dB |
| No. 2 |  | 71% | 4.60dB/mm | 39dB |
| No. 3 |  | 9% | 2.94dB/mm | 44dB |

METHOD OF PRODUCING NONLINEAR OPTICAL DEVICE

TECHNICAL FIELD

The present disclosure relates to a method of producing a nonlinear optical device. The present application claims the benefit of priority to Japanese Patent Application No. 2020-130371 filed on Jul. 31, 2020, the entire contents of which are incorporated herein by reference.

BACKGROUND ART

Methods for filling liquid material into a very small recess formed in the surface of a substrate has been under study (see PTL 1 to PTL 5 and NPL 1, for example).

CITATION LIST

Patent Literature

PTL 1: Japanese Patent Laying-Open No. 2004-071934
PTL 2: Japanese Patent Laying-Open No. 2004-103817
PTL 3: Japanese National Patent Publication No. 2007-509769
PTL 4: Japanese Patent Laying-Open No. 2011-210942
PTL 5: Japanese Patent Laying-Open No. 2014-099525

Non Patent Literature

NPL 1: H. Hiroshima, M. Komuro, "Control of Bubble Defects in UV Nanoimprint" Japanese Journal Applied Physics, Vol. 46, pp. 6391-6394 (September 2007)

SUMMARY OF INVENTION

A method of producing a nonlinear optical device according to an aspect of the present disclosure comprises:

- forming a recessed part in a surface of a semiconductor substrate;
- filling a first liquid material into the recessed part in an environment under reduced pressure;
- bringing a second liquid material into contact with the first liquid material filled in the recessed part to prepare a third liquid material; and
- solidifying the third liquid material to form an embedded portion, wherein
- the first liquid material includes a first solute and a first solvent, or the first liquid material consists of the first solvent,
- the second liquid material includes a second solute and a second solvent,
- the second solute includes a nonlinear optical polymer, and
- a concentration of the second solute in the second liquid material is higher than a concentration of the first solute in the first liquid material.

DETAILED DESCRIPTION

Figure 1:
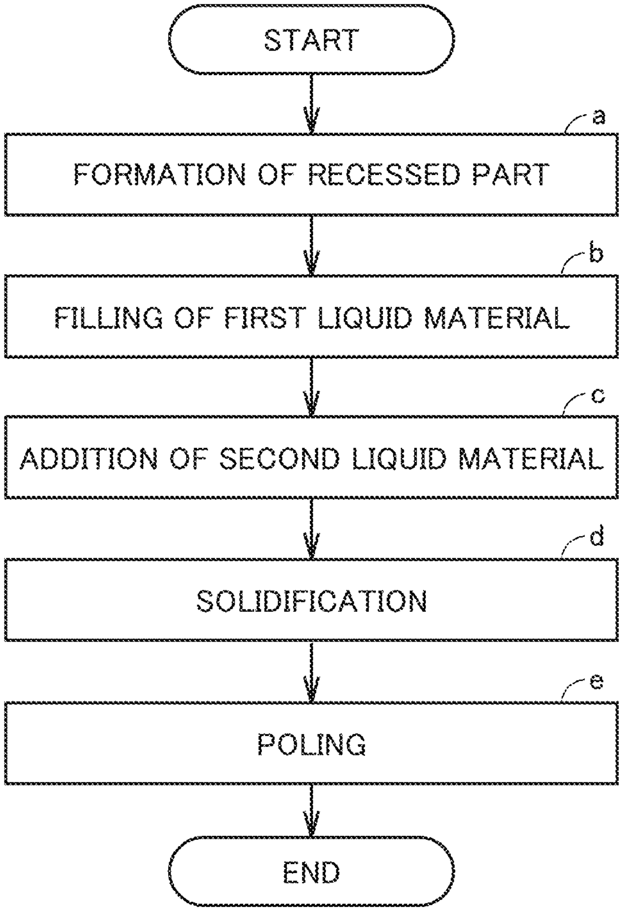
FIG. 1 is a schematic flowchart for a method of producing a nonlinear optical device according to the present embodiment.

Problem to be Solved by the Present Disclosure

Research has been underway directed to an embedded structure in a nonlinear optical (NLO) device. The embedded structure is formed by filling an NLO polymer into a recessed part formed in the surface of a semiconductor substrate. For example, a polymer solution in which an NLO polymer is dissolved is used. More specifically, the polymer solution is applied to the surface of a semiconductor substrate having a recessed part, and then allowed to be solidified, and thereby an embedded portion may be formed.

A long with the current trend toward more compact and more highly-integrated NLO devices, there has been a demand for filling polymer solution into tighter, deeper recessed parts. The tighter and deeper the recessed part is, the more likely a void is to remain in the recessed part after the filling. For example, when the embedded portion includes an optical waveguide, a void remaining inside the embedded portion may cause light scattering. This may cause propagation loss.

In order to decrease such a void, the polymer solution filled in the recessed part may be heated, for example. Increased temperature of the polymer solution is expected to increase the mobility of air bubbles, leading to a decrease of such a void.

Here, the NLO polymer includes a host polymer and guest molecules, for example. The guest molecules are dispersed in the host polymer. The guest molecule is a polar molecule having NLO activity. When the polymer solution is heated and thereby the temperature of the polymer solution is increased enough for the NLO polymer to flow, the guest molecules can aggregate to each other by dipole pole interaction. When the guest molecules thus aggregate, NLO activity can be lost.

In order to decrease the void, the filling of the recessed part with the polymer solution may be carried out in a pressurized atmosphere, for example. The applied pressure is expected to cause shrinkage of air bubbles. The shrinkage of the air bubbles is expected to cause a decrease of the void. However, the shrinkage of the air bubbles occurs only in inverse proportion to the applied pressure. Therefore, it seems to be impossible to completely remove the void.

In order to decrease the void, the polymer solution filled in the recessed part may be degassed in a vacuum atmosphere, for example. At the time of vacuum degassing, volatilization of the solvent is expected to occur. The solvent volatilization occurs from the surface of the polymer solution. As a result, the surface of the polymer solution starts to solidify. Surface solidification of the polymer solution during degassing under reduced pressure can interfere with the degassing process or allow for formation of irregularities in the surface of the embedded portion. For example, when the embedded portion includes an optical waveguide, such surface irregularities can impair optical properties. To avoid this, the optical waveguide needs to be positioned away from the surface so as to sufficiently reduce the influence on optical properties. This, however, can interfere with size-reduction of the NLO device.

An object of the present disclosure is to form, in an NLO device, an embedded portion that has a smooth surface and decreased void.

Effect of the Present Disclosure

It is expected that the present disclosure makes it possible to form an embedded portion that has a smooth surface and decreased void.

Description of Embodiments

Firstly, aspects of the present disclosure will be provided along with description. It should be noted that the action mechanism according to the present disclosure includes presumption. The scope of claims should not be limited by whether or not the action mechanism is correct.

[1] A method of producing a nonlinear optical device according to an aspect of the present disclosure comprises the following (a) to (d):

(a) forming a recessed part in a surface of a semiconductor substrate;
(b) filling a first liquid material into the recessed part in an environment under reduced pressure;
(c) bringing a second liquid material into contact with the first liquid material filled in the recessed part to prepare a third liquid material; and
(d) solidifying the third liquid material to form an embedded portion.

The first liquid material includes a first solute and a first solvent, or the first liquid material consists of the first solvent. The second liquid material includes a second solute and a second solvent. The second solute includes a nonlinear optical polymer. The concentration of the second solute in the second liquid material is higher than the concentration of the first solute in the first liquid material.

The concentration of the second liquid material according to the present disclosure is higher than that of the first liquid material. Herein, the second liquid material is also called “a high-concentration solution”. The first liquid material is also called “a low-concentration solution”. It should be noted that these “high-concentration” and “low-concentration” merely refer to the relative concentrations between the second liquid material and the first liquid material, not referring to the absolute concentrations thereof.

In the method of producing an NLO device according to the present disclosure, firstly, the low-concentration solution (the first liquid material) is filled into the recessed part. The first liquid material may consist of the solvent. The low-concentration solution may have a low viscosity. The low-concentration solution is expected to enter into the recessed part easily. In the low-concentration solution, air bubbles are expected to move easily. That is, air bubbles are expected to readily come out from the solution.

Further, it is expected that surface solidification of the low-concentration solution tends not to proceed even in an environment under reduced pressure.

After the recessed part is filled with the low-concentration solution, the high-concentration solution (the second liquid material) is added to the low-concentration solution. The solute (the NLO polymer) diffuses from the high-concentration solution into the low-concentration solution, and thereby a mixed solution (the third liquid material) is formed. The mixed solution in the recessed part is solidified, and thereby an embedded portion is formed. “Solidification” according to the present disclosure refers to substantially removing the solvent from the solution to allow the solute to precipitate.

As described above, in the method of producing an NLO device according to the present disclosure, the low-concentration solution (the first liquid material) may be able to permeate throughout the recessed part and thereby a decrease of air bubbles is expected to be achieved. As a result, a decrease of voids in the embedded portion after solidification is also expected to be achieved.

Further, surface solidification of the low-concentration solution (the first liquid material) tends not to proceed. Therefore, the surface of the embedded portion is expected to become smooth.

[2] In the method of producing a nonlinear optical device according to [1] above, the first solute may include a nonlinear optical polymer, for example.

[3] In the method of producing a nonlinear optical device according to [1] or [2] above, at least part of the recessed part may be formed in such a manner that it extends linearly along the surface of the semiconductor substrate, for example.

The linearly-extending recessed part may also be called “a slot” and/or the like. When the recessed part extends linearly, a slot-waveguide-type NLO device may be produced, for example.

[4] In the method of producing a nonlinear optical device according to any one of [1] to [3] above, a ratio of a depth of the recessed part to a width of the recessed part may be from 0.5 to 12, for example.

Hereinafter, “the ratio of the depth (d) of the recessed part to the width (w) of the recessed part” is also called “an aspect ratio (d/w)”. When the aspect ratio is 0.5 or more, high integration is expected to be achieved, for example. When the aspect ratio is 12 or less, a decrease of a void is expected to be achieved, for example.

[5] In the method of producing a nonlinear optical device according to any one of [1] to [4] above, the width of the recessed part may be 170 nm or less, for example.

In the method of producing an NLO device according to the present disclosure, even when the recessed part is as narrow as 170 nm or less in width, for example, a decrease of a void is expected to be achieved.

[6] In the method of producing a nonlinear optical device according to any one of [1] to [5] above, a concentration of the first solute in the first liquid material may be from 0 mass % to 35 mass %, for example. The concentration of the second solute in the second liquid material may be from 5 mass % to 40 mass %, for example.

For example, when the concentration of the first liquid material is 35 mass % or less, a decrease of a void is expected to be achieved. For example, when the concentration of the second liquid material is 40 mass % or less, the time required for diffusion of the solute may decrease.

[7] In the method of producing a nonlinear optical device according to any one of [1] to [6] above, the nonlinear optical polymer may include a structure represented by, for example, the following formula (I):

[Chemical 1]

(I)

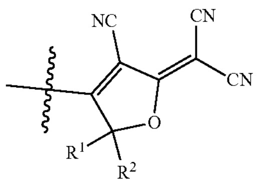

where each of $R^1$ and $R^2$ is independently a hydrogen atom, an alkyl group, an alkenyl group, a cycloalkyl group, a cycloalkenyl group, an alkoxy group, a haloalkyl group, an aryl group, a hydroxy group, a thiol group, or an amino group.

The structure represented by the above formula (I) may serve as an electron-withdrawing group (an acceptor). The NLO polymer including the structure represented by the above formula (I) is expected to have a high degree of NLO effect.

[8] In the method of producing a nonlinear optical device according to any one of [1] to [7] above, each of the first solvent and the second solvent may include, for example, at least one selected from the group consisting of acetone, methyl ethyl ketone, cyclopentanone, cyclohexanone, cycloheptanone, acetylacetone, methyl amyl ketone, n-methyl ketone, butyrolactone, tetrahydrofuran, chloroform, dibromomethane, 1,2-dichloroethane, 1,2-dibromoethane, 1,1,2-trichloroethane, 1,1,2,2-tetrachloroethane, 1,1,2-tribromoethane, 1,1,2,2-tetrabromoethane, ethyl acetate, butyl acetate, methyl lactate, ethyl lactate, butyl lactate, propylene glycol methyl ether, propylene glycol monomethyl ether acetate, and ethyl cellosolve acetate.

[9] In the method of producing a nonlinear optical device according to any one of [1] to [8] above, the second solvent may be the same material as the first solvent, for example. The second solute may be the same material as the first solute, for example.

When the second solvent is the same material as the first solvent and the second solute is the same material as the first solute, the second liquid material and the first liquid material are expected to be uniformly mixed with each other, for example.

[10] In the method of producing a nonlinear optical device according to [1] above, the first solute may include, for example, a nonlinear optical polymer. For example, at least part of the recessed part may be formed in such a manner that it extends linearly along the surface of the semiconductor substrate. The ratio of a depth of the recessed part to a width of the recessed part may be from 0.5 to 12. The width of the recessed part may be 170 nm or less. The concentration of the first solute in the first liquid material may be from 0 mass % to 35 mass %. The concentration of the second solute in the second liquid material may be from 5 mass % to 40 mass %.

Detailed Description of Embodiments

In the following, embodiments of the present disclosure (hereinafter also called "the present embodiment") are described in detail. It should be noted that the scope of claims is not limited by the following description.

In the present embodiment, any geometric term (such as "parallel", "vertical", and "straight line", for example) refers to a geometric state that is at least substantially the same as the exact meaning of the term. Any geometric term according to the present embodiment should not be interpreted solely in its exact meaning. For example, "parallel" refers to a geometric state that is substantially parallel. That is, "parallel" may mean a geometric state that is deviated, to some extent, from exact parallel. The "geometric state that is substantially parallel" may include tolerances and/or errors in terms of design and/or production, for example.

In the present embodiment, an expression such as "from 0.5 to 12", for example, means a range that includes the boundary values, unless otherwise specified. For example, "from 0.5 to 12" means a range of "not less than 0.5 and not more than 12".

In the present embodiment, the "nonlinear optical device" means a product that includes at least a semiconductor substrate and a nonlinear optical polymer. For example, the nonlinear optical device may consist of a semiconductor substrate and a nonlinear optical polymer. As long as it includes at least a semiconductor substrate and a nonlinear optical polymer, the nonlinear optical device may be any device. For example, the nonlinear optical device may be an optical modulator, an optical switch, an optical transceiver, an optical phased array, LiDAR (Light Detection And Ranging), a terahertz-wave generator, a terahertz-wave detector, a semiconductor substrate with a polymer film, and/or the like.

In the present embodiment, a nonlinear optical device having an embedded portion is provided. As long as it has an embedded portion, the nonlinear optical device may have any structure. For example, the nonlinear optical device may have a slot waveguide structure, a photonic crystal structure, a metamaterial structure, a plasmon waveguide structure, and/or the like. A slot waveguide structure and a photonic crystal structure are described below as examples.

In the present embodiment, the "nonlinear optical polymer" refers to a polymer material that exhibits a nonlinear optical effect. For example, the nonlinear optical effect may be electrooptic effect and/or the like, or may be optical harmonic generation, optical Kerr effect, and/or the like. That is, the "nonlinear optical polymer" according to the present embodiment includes "an electrooptic polymer". The "nonlinear optical device" according to the present embodiment includes "an electrooptic device".

In the present embodiment, a dimension (such as the width of a recessed part, for example) of 1≈m or less is measured in an electron micrograph. For a single measurement target, three or more electron micrographs are captured at different positions. In each electron micrograph, the dimension is measured at three or more positions. That is, the dimension is measured at nine or more positions. The arithmetic mean of these nine or more values is regarded as the dimension of the measurement target. The electron microscope is selected as appropriate depending on the measurement target. For example, the electron microscope may be a transmission electron microscope (TEM), a scanning electron microscope (SEM), and/or the like.

<Method of Producing Nonlinear Optical Device>

FIG. 1 is a schematic flowchart for a method of producing a nonlinear optical device according to the present embodiment. The method of producing an NLO device according to the present embodiment includes "(a) formation of a recessed part", "(b) filling of a first liquid material", "(c) addition of a second liquid material", and "(d) solidification". The method of producing an NLO device according to the present embodiment may further include "(e) poling" and the like.

<<(a) Formation of Recessed Part>>

Figure 2:
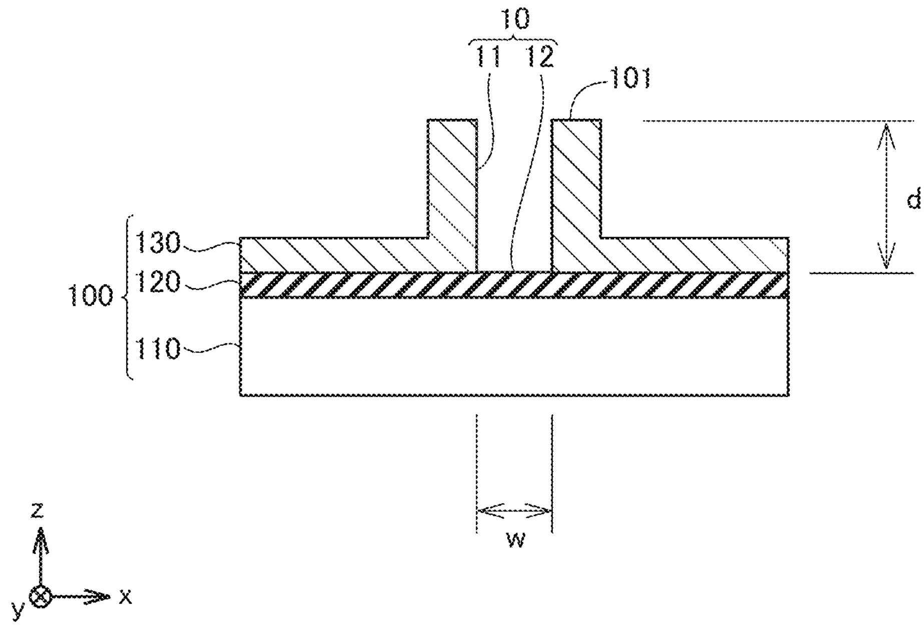
FIG. 2 is a first schematic cross-sectional view illustrating a process of producing a nonlinear optical device according to the present embodiment.

FIG. 2 is a first schematic cross-sectional view illustrating a process of producing a nonlinear optical device according to the present embodiment. The method of producing an NLO device according to the present embodiment includes forming a recessed part 10 in a surface 101 of a semiconductor substrate 100.

(Semiconductor Substrate)

Semiconductor substrate 100 may have any shape. For example, the planar shape of semiconductor substrate 100 may be circular or rectangular. Semiconductor substrate 100 may have a diameter from 25 mm to 300 mm, for example. When the planar shape of semiconductor substrate 100 is circular, the diameter of semiconductor substrate 100 refers to the diameter of the circle. When the planar shape of semiconductor substrate 100 is not circular, the diameter of semiconductor substrate 100 refers to the distance between two points located farthest apart from each other on the outline of semiconductor substrate 100.

Semiconductor substrate 100 may include any semiconducting material. For example, semiconductor substrate 100 may include at least one selected from the group consisting of silicon (Si), silicon carbide (SiC), indium phosphorus (InP), gallium arsenic (GaAs), gallium nitride (GaN), diamond, silicon nitride ($Si_3N_4$), titanium oxide ($TiO_2$), tantalum oxynitride (TaON), tantalum pentoxide ($Ta_2O_5$), niobium oxynitride (NbON), niobium pentoxide ($Nb_2O_5$), IZO $[(In_2O_3)_x(ZnO)_{1-x}]$, IGZO $[(In_2O_3)_x(ZnO)_y(Ga_2O_3)_z, x+y+z=1]$, AZO $[(Al_2O_3)_x(ZnO)_{1-x}]$, TTON $[(TiO_2)_x(TaON)_{1-x}]$, and the like. Although each of these materials is listed together with their typical stoichiometric composition formula, the material is not limited to the exact material that is represented by the stoichiometric composition formula, and may be any semiconducting material that is typified by the stoichiometric composition formula.

For example, semiconductor substrate 100 may have a monolayer structure. For example, semiconductor substrate 100 may consist of a Si substrate 110. For example, semiconductor substrate 100 may have a multi layer structure. For example, semiconductor substrate 100 may be an SOI (Silicon On Insulator) substrate. That is, semiconductor substrate 100 may include Si substrate 110, a BOX (Buried oxide) layer 120, and a Si active layer 130, for example. Si active layer 130 is a Si single crystal layer. The Si active layer may be doped with impurities, for example. BOX layer 120 is interposed between Si substrate 110 and Si active layer 130. BOX layer 120 includes silicon dioxide ($SiO_2$). When an optical waveguide is formed on BOX layer 120, a strong light-confinement effect is expected to be obtained, for example.

Each layer of the SOI substrate may have any thickness. For example, BOX layer 120 may have a thickness from 0.1≈m to 50≈m. For example, BOX layer 120 may have a thickness from 1≈m to 10≈m. For example, Si active layer 130 may have a thickness from 0.1≈m to 500≈m. For example, Si active layer 130 may have a thickness from 0.1≈m to 1≈m. For example, Si active layer 130 may have a thickness from 0.1≈m to 0.5≈m (namely, from 100 nm to 500 nm). For example, Si substrate 110 may have a thickness from 100≈m to 1 mm.

(Recessed Part)

Recessed part 10 may be formed by any method. For example, recessed part 10 may be formed by patterning by lithography as well as by reactive ion etching (RIE). For example, the area surrounding recessed part 10 may be scraped away so that the mouth of recessed part 10 is raised from the surrounding area.

In the present embodiment, "recessed part 10" includes a side wall 11 and a bottom portion 12. Side wall 11 and surface 101 of semiconductor substrate 100 cross with each other. Side wall 11 may be flat or may be curved. For example, side wall 11 may be substantially vertical to surface 101 of semiconductor substrate 100. For example, side wall 11 may be inclined from surface 101 of semiconductor substrate 100.

Figure 17:
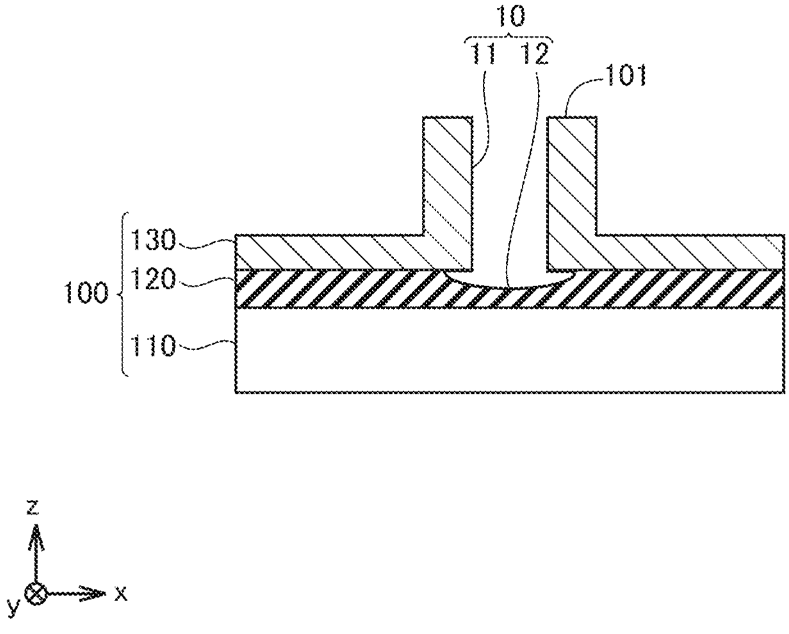
FIG. 17 is a schematic cross-sectional view illustrating an example of a bottom portion.

In the cross section illustrated in FIG. 2, bottom portion 12 connects a pair of side walls 11 that are facing to each other. For example, bottom portion 12 may be flat or may be curved. In the cross section illustrated in FIG. 2, bottom portion 12 may be a point, for example. For example, bottom portion 12 may be parallel to surface 101 of semiconductor substrate 100. For example, bottom portion 12 may not be parallel to surface 101 of semiconductor substrate 100. For example, the cross-sectional profile of recessed part 10 may be rectangular, U-shaped, V-shaped, and/or the like. For example, as illustrated in FIG. 17, the width of bottom portion 12 may be greater than the width of the mouth.

When semiconductor substrate 100 is an SOI substrate, bottom portion 12 may be positioned within Si active layer 130, for example. Bottom portion 12 may be positioned within BOX layer 120, for example. Bottom portion 12 may be positioned within Si substrate 110, for example.

When the planar shape of recessed part 10 is circular, the "width (w)" of recessed part 10 refers to the diameter of the circle. When the planar shape of recessed part 10 is not circular, the "width (w)" of recessed part 10 refers to the short diameter of the planar shape of recessed part 10. In the present embodiment, the "short diameter" is defined as below. A straight line that connects the two points located farthest apart from each other on the outline of the planar shape of recessed part 10 is the long diameter. Among all the diameters perpendicular to the long diameter, the greatest diameter is defined as the short diameter. It should be noted that when the planar shape of recessed part 10 extends linearly, the long diameter may not be able to specify. In this case, the width of recessed part 10 in a direction perpendicular to the extending direction of the recessed part in a top view (FIG. 3) of the recessed part is regarded as the width (w) of recessed part 10.

Recessed part 10 may have any width (w). For example, recessed part 10 may have a width (w) of 170 nm or less. In the method of producing an NLO device according to the present embodiment, even when recessed part 10 has a width (w) as small as 170 nm or less, for example, a decrease of a void is expected to be achieved. For example, recessed part 10 may have a width (w) of 150 nm or less. For example, recessed part 10 may have a width (w) of 100 nm or less. The lower limit to the width (w) is not particularly limited. For example, recessed part 10 may have a width (w) of 10 nm or more. For example, recessed part 10 may have a width (w) of 50 nm or more. For example, recessed part 10 may have a width (w) of 80 nm or more.

The "depth (d)" of recessed part 10 refers to the shortest distance, in a cross section vertical to surface 101 of semiconductor substrate 100 (in FIG. 2, for example), between the deepest position of recessed part 10 and the mouth of recessed part 10. Recessed part 10 may have any depth (d). For example, recessed part 10 may have a depth (d) of 50 nm or more. For example, recessed part 10 may have a depth (d) of 100 nm or more. For example, recessed part 10 may have a depth (d) of 200 nm or more. The upper limit to the depth (d) is not particularly limited. For example, recessed part 10 may have a depth (d) of 3≈m or less. For example, recessed part 10 may have a depth (d) of 2≈m or less. For example, recessed part 10 may have a depth (d) of 1≈m or less. For example, recessed part 10 may have a depth (d) of 300 nm or less.

Recessed part 10 may have any aspect ratio (d/w). For example, recessed part 10 may have an aspect ratio (d/w) from 0.5 to 12. When the aspect ratio (d/w) is 0.5 or more, high integration is expected to be achieved, for example. For example, recessed part 10 may have an aspect ratio (d/w) of 1 or more. For example, recessed part 10 may have an aspect ratio (d/w) of 1.5 or more. When the aspect ratio (d/w) is 12 or less, a decrease of a void is expected to be achieved, for example. For example, recessed part 10 may have an aspect ratio (d/w) of 8 or less. For example, recessed part 10 may have an aspect ratio (d/w) of 4 or less. For example, recessed part 10 may have an aspect ratio (d/w) from 0.5 to 4.

The planar shape of recessed part 10 is not particularly limited. For example, the planar shape of recessed part 10 may be circular, polygonal, and/or the like. The polygonal shape may be a triangle, a tetragon, a pentagon, a hexagon, and/or the like, for example.

Figure 3:
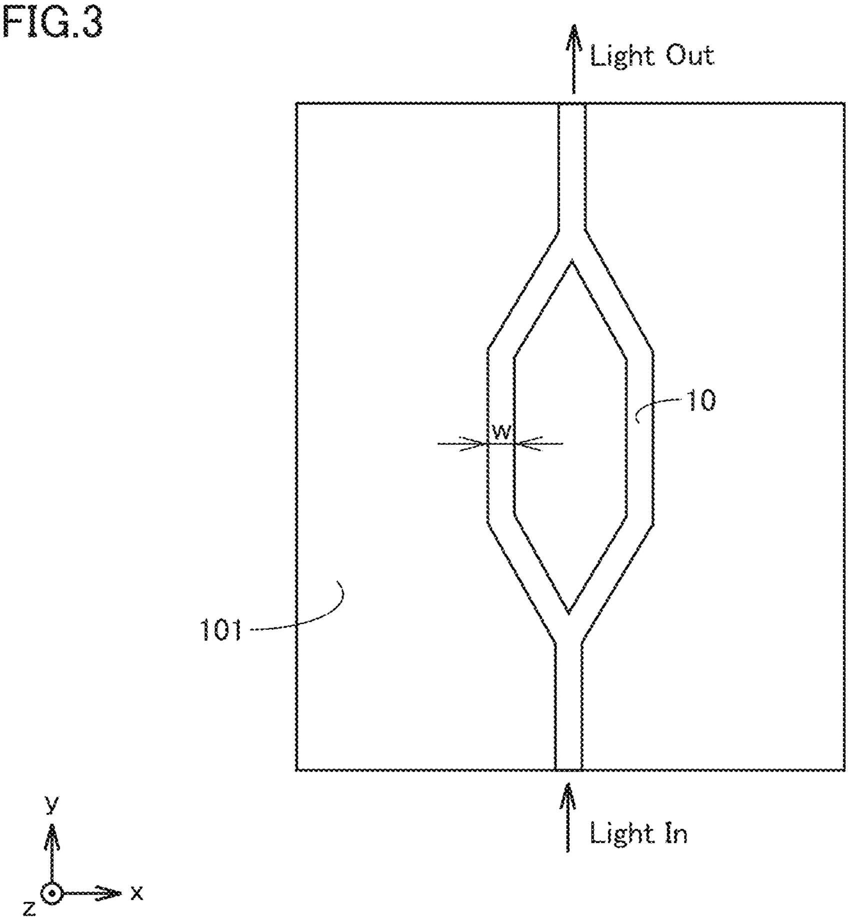
FIG. 3 is a schematic top view illustrating a first example of recessed part.

FIG. 3 is a schematic top view illustrating a first example of recessed part. For example, recessed part 10 may be formed in such a manner that it extends linearly. When the NLO polymer is filled into a linearly-extending recessed part, a slot waveguide structure may be formed, for example. The arrows in FIG. 3 indicate the direction of light propagation. For example, recessed part 10 may extend in a straight line. For example, recessed part 10 may extend in a curved line. For example, recessed part 10 may extend in a bending line. For example, recessed part 10 may be branched into a plurality of branches. For example, a plurality of recessed parts 10 may join into one.

Figure 4:
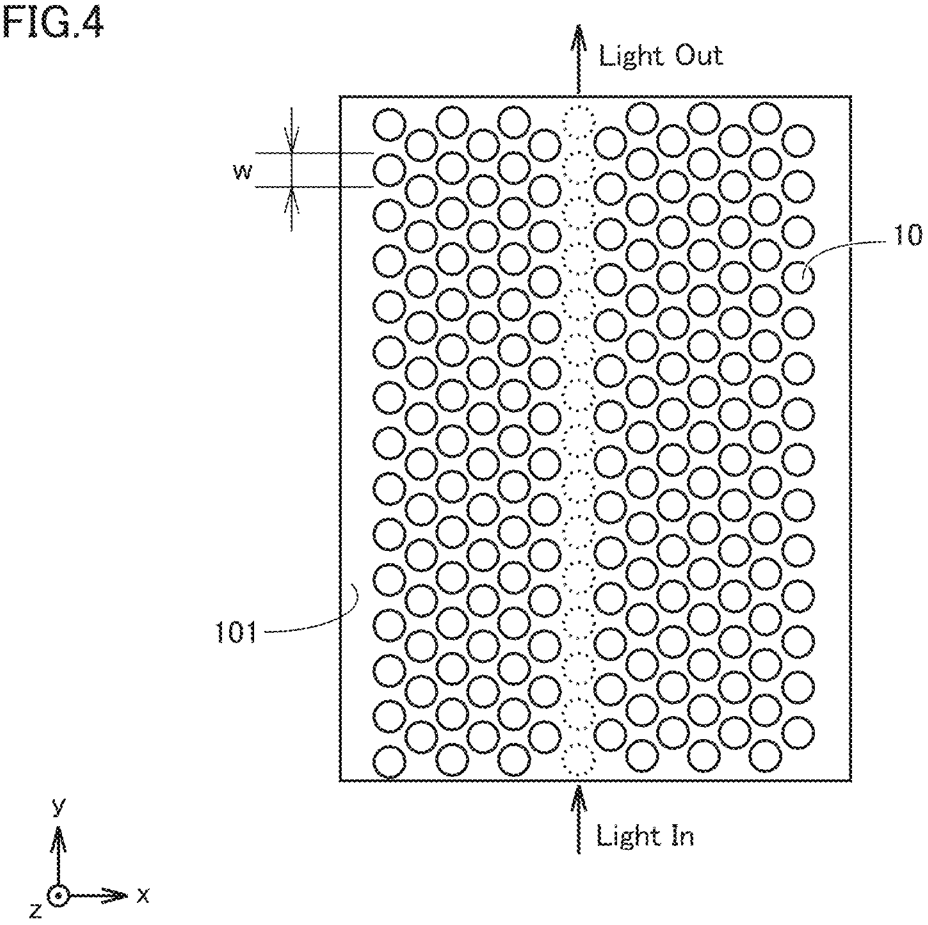
FIG. 4 is a schematic top view illustrating a second example of recessed part.

FIG. 4 is a schematic top view illustrating a second example of recessed part. For example, recessed parts 10 may form a photonic crystal structure. In the photonic crystal structure, the planar shape of recessed part 10 may be, for example, circular and/or the like. For example, in surface 101 of semiconductor substrate 100, a plurality of recessed parts 10 are arranged in a triangle lattice. For example, an NLO polymer may be filled into one row of recessed parts 10. The row filled with the NLO polymer may form a photonic crystal waveguide. The arrows in FIG. 4 indicate the direction of light propagation. In addition, the photonic crystal structure may be combined with and surround a linearly-extending slot structure. In this case, some recessed parts 10 out of the plurality of recessed parts 10 are to extend linearly along the surface of semiconductor substrate 100. That is, at least part of recessed parts 10 may extend linearly along the surface of semiconductor substrate 100.

Figure 5:
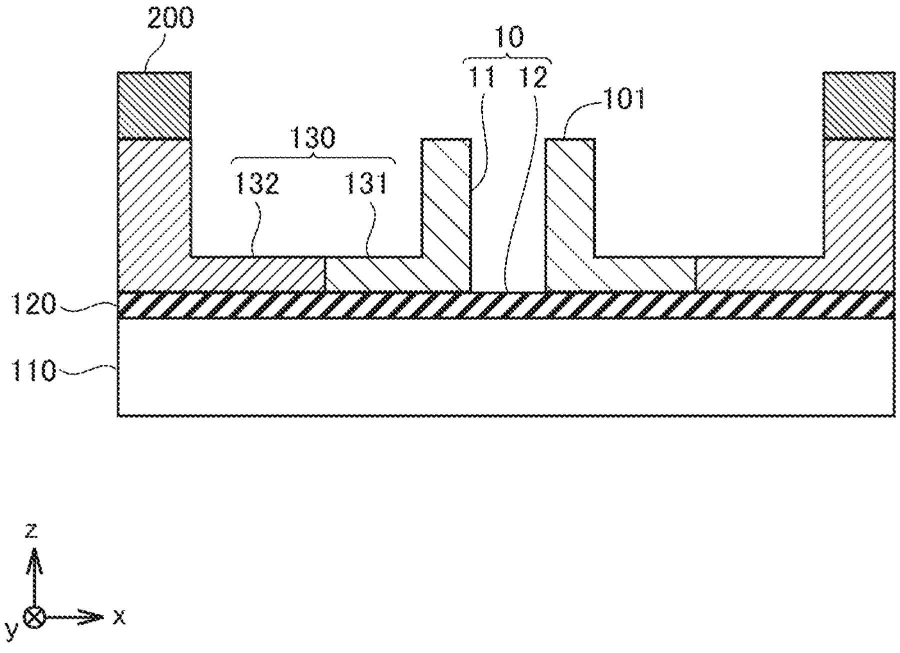
FIG. 5 is a second schematic cross-sectional view illustrating a process of producing a nonlinear optical device according to the present embodiment.

FIG. 5 is a second schematic cross-sectional view illustrating a process of producing a nonlinear optical device according to the present embodiment. In the present embodiment, in addition to the formation of recessed part 10, doping with impurities, formation of an electrode, and the like may also be carried out.

For example, in Si active layer 130, a first doped region 131 and a second doped region 132 may be formed. Each of the doped regions may be formed by any method. For example, ion injection and/or the like may be carried out. For example, the conductivity type of each of first doped region 131 and second doped region 132 may be n-type. For example, each of first doped region 131 and second doped region 132 may be doped with impurities such as phosphorus (P).

First doped region 131 includes side wall 11 of recessed part 10. First doped region 131 may have a relatively low doping concentration. When first doped region 131 has a low doping concentration, propagation loss is expected to be decreased, for example.

Second doped region 132 is in contact with an electrode 200. Second doped region 132 may have a relatively high doping concentration. When second doped region 132 has a high doping concentration, contact resistance with electrode 200 is expected to be decreased, for example.

For example, the doping concentration of first doped region 131 may be lower than the doping concentration of second doped region 132. For example, the doping concentration of first doped region 131 may be from $1B10^{16}$ $cm^{-3}$ to $1B10^{17}$ $cm^{-3}$. For example, the doping concentration of second doped region 132 may be from $1B10^{17}$ $cm^{-3}$ to $1B10^{18}$ $cm^{-3}$.

In the present embodiment, doping with impurities may be carried out at any timing. For example, doping with impurities may be carried out before formation of recessed part 10. For example, doping with impurities may be carried out after formation of recessed part 10.

Electrode 200 may include, for example, at least one selected from the group consisting of aluminum (Al), tungsten (W), titanium (Ti), zirconium (Zr), hafnium (Hf), vanadium (V), chromium (Cr), molybdenum (Mo), tantalum (Ta), niobium (Nb), nickel (Ni), cobalt (Co), gold (Au), silver (Ag), copper (Cu), platinum (Pt), and the like. Electrode 200 may be formed by any method. For example, electrode 200 may be formed by vapor deposition and/or the like. For example, electrode 200 may be a signal electrode and/or the like. For example, electrode 200 may be a ground electrode and/or the like.

In the present embodiment, electrode 200 may be formed at any timing. For example, electrode 200 may be formed before application of polymer solution. For example, electrode 200 may be formed after formation of a polymer film 300.

<<(b) Filling of First Liquid Material>>

Figure 6:
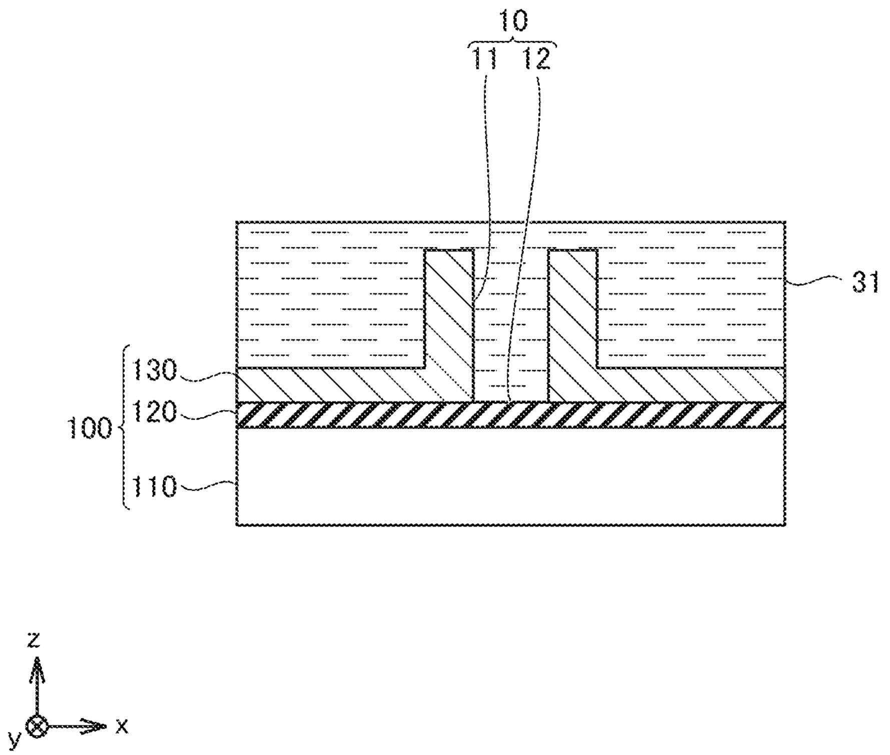
FIG. 6 is a third schematic cross-sectional view illustrating a process of producing a nonlinear optical device according to the present embodiment.

FIG. 6 is a third schematic cross-sectional view illustrating a process of producing a nonlinear optical device according to the present embodiment. The method of producing an NLO device according to the present embodiment includes filling a first liquid material 31 into recessed part 10 in an environment under reduced pressure.

First liquid material 31 is filled into recessed part 10 by any method. For example, first liquid material 31 may be applied to surface 101 of semiconductor substrate 100 by spin coating and/or the like. For example, a spin coater capable of controlling the pressure of the atmosphere may be used.

In the present embodiment, the “environment under reduced pressure” refers to an atmosphere that has a pressure lower than atmospheric pressure. In an atmosphere under reduced pressure, degassing is expected to be facilitated. First liquid material 31 is either a low-concentration solution or a solvent alone. Surface solidification of first liquid material 31 tends not to occur. For example, the environment under reduced pressure may have a pressure from 0.1 Pa to 90 kPa. For example, the environment under reduced pressure may have a pressure from 100 Pa to 80 kPa. For example, the environment under reduced pressure may have a pressure from 3 kPa to 70 kPa.

First liquid material 31 includes a first solute and a first solvent, or first liquid material 31 consists of the first solvent. The first solute is dissolved in the first solvent. For example, the concentration of the first solute in first liquid material 31 may be from 0 mass % to 35 mass %. For example, the concentration of the first solute in first liquid material 31 may be from 0 mass % to 20 mass %. For example, the concentration of the first solute in first liquid material 31 may be from 0 mass % to 10 mass %.

First liquid material 31 may have a low viscosity. For example, the first liquid material may have a viscosity from 1 mPa·s to 2000 mPa·s. For example, the first liquid material may have a viscosity from 1 mPa·s to 1000 mPa·s. For example, the first liquid material may have a viscosity from 1 mPa·s to 10 mPa·s. In the present embodiment, the “viscosity” of liquid may be measured with a micro-sample viscometer manufactured by RheoSense (trade name, “micr5VISC”). Alternatively, a product similar to this viscometer may be used. The measurement temperature is 25° C., 1° C. For a single measurement target, viscosity is measured three times or more. The arithmetic mean of the three or more measurements is regarded as the viscosity of the measurement target (Solvent)

The first solvent may include any component. The first solvent may include, for example, at least one selected from the group consisting of acetone, methyl ethyl ketone, cyclopentanone, cyclohexanone, cycloheptanone, acetylacetone, methyl amyl ketone, n-methyl ketone, γ-butyrolactone, tetrahydrofuran, chloroform, dibromomethane, 1,2-dichloroethane, 1,2-dibromoethane, 1,1,2-trichloroethane, 1,1,2,2-tetrachloroethane, 1,1,2-tribromoethane, 1,1,2,2-tetrabromoethane, ethyl acetate, butyl acetate, methyl lactate, ethyl lactate, butyl lactate, propylene glycol methyl ether, propylene glycol monomethyl ether acetate, and ethyl cellosolve acetate.

(Solute)

The first solute may include any component. The first solute may substantially consist of one component, or may consist of a plurality of components. For example, the first solute may include a low-molecule compound, an oligomer, a polymer, and/or the like.

For example, the first solute may include a surfactant and/or the like. For example, the surfactant may function as a solvent evaporation inhibitor. When the surfactant functions as an evaporation inhibitor, solvent evaporation at the surface of first liquid material 31 and a third liquid material 33 (described below) may be decreased, for example. As a result, surface roughness of polymer film 300 (described below) is expected to be decreased, for example. The surfactant may include, for example, a fluorine-based surfactant and/or the like (such as “MEGAFACE” (trade name) manufactured by DIC, for example).

For example, the first solute may include an NLO dye molecule and/or the like. The NLO dye molecule refers to a molecule having NLO activity. For example, the NLO dye molecule may include an electrooptic (EO) dye molecule, which is described below. When the first solute includes the NLO dye molecule, the orientation of the NLO dye molecule at the time of poling treatment is expected to be improved, for example.

For example, the first solute may include an NLO polymer. The first solute may consist essentially of an NLO polymer. The NLO polymer is a polymer material that exhibits nonlinear optical effect. For example, the NLO polymer may include an EO polymer and/or the like. For example, the NLO polymer may consist essentially of an EO polymer.

(EO Polymer)

The EO polymer exhibits electrooptic effect. As long as it exhibits electrooptic effect, the EO polymer may include any component. For example, the EO polymer may include a guest/host polymer and/or the like. The guest/host polymer includes a guest molecule and a host polymer. The guest molecule is dispersed in the host polymer. For example, the concentration of the guest molecule in the guest/host polymer may be from 10 mass % to 50 mass %. For example, the host polymer may include polymethyl methacrylate (PMMA), polycarbonate (PC), and/or the like.

The guest molecule exhibits electrooptic effect. The guest molecule is also called “an EO dye molecule”. For example, the guest molecule may include an electron-donating group (a donor), a linking group, and an electron-withdrawing group (an acceptor). The linking group connects the donor and the acceptor to each other. For example, the linking group may include a (u-)conjugated structure and/or the like. For example, the linking group may include a structure represented by the following formulae (II) to (IV):

[Chemical 2]

(II)

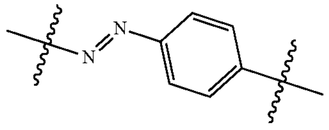

(III)

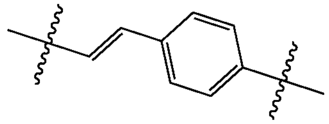

(IV)

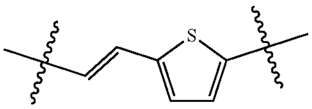

For example, the donor may include a structure represented by the following formula (V):

[Chemical 3]

(V)

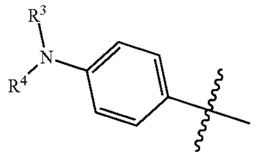

where each of $R^3$ and $R^4$ is independently a hydrogen atom, an alkyl group, a hydroxyalkyl group, a haloalkyl group, an aryl group, and/or the like.

For example, the acceptor may be represented by the following formula (I):

[Chemical 4]

(I)

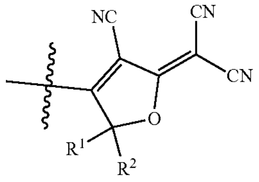

That is, the NLO polymer may include a structure represented by the above formula (I).

In the above formula (I), each of $R^1$ and $R^2$ is independently a hydrogen atom, an alkyl group, an alkenyl group, a cycloalkyl group, a cycloalkenyl group, an alkoxy group, a haloalkyl group, an aryl group, a hydroxy group, a thiol group, or an amino group.

An EO polymer that includes an acceptor represented by the above formula (I) may exhibit a high degree of electrooptic effect. For example, the alkyl group may be a methyl group and/or the like. For example, the haloalkyl group may be a trifluoromethyl group and/or the like. When $R^1$ and/or $R^2$ is an aryl group, the aryl group may have a substituent. For example, the aryl group may be a phenyl group, a naphthyl group, and/or the like. For example, a hydrogen atom of the aryl group may be substituted with a halogen atom, an alkyl group, a haloalkyl group, and/or the like.

For example, in the above formula (I), each of $R^1$ and $R^2$ may be independently a hydrogen atom, a methyl group, a trifluoromethyl group, or a phenyl group.

For example, the EO polymer may be formed by bonding an EO dye molecule as a side chain to a linear polymer. For example, the EO dye molecule may be bonded to the linear polymer (the main chain) by reaction of a reactive group (such as a hydroxy group, for example) contained in the donor. The linear polymer may be a homopolymer or may be a copolymer. For example, the copolymer may be any of a random copolymer, an alternate copolymer, a block copolymer, and a graft copolymer. In the present embodiment, an EO polymer in which an EO dye molecule as a side chain is bonded to a linear copolymer is also called "a sidechain copolymer".

Figure 18:
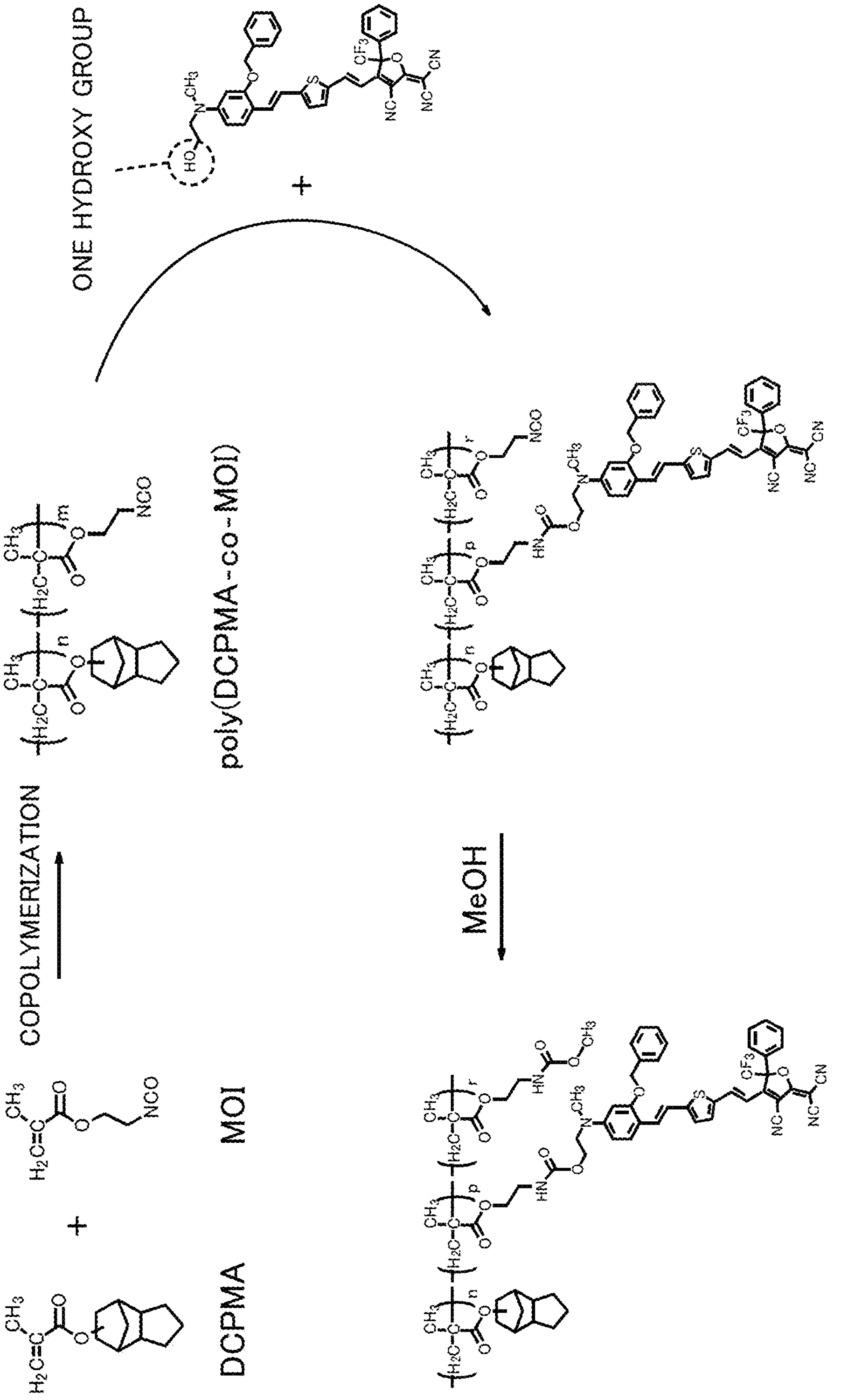
FIG. 18 is an example scheme of synthesis of a sidechain copolymer.

FIG. 18 is an example scheme of synthesis of a sidechain copolymer. Firstly, dicyclopentanyl methacrylate (DCPMA) and 2-methacryloyloxyethyl isocyanate (MOI) are copolymerized, and thereby a linear copolymer is synthesized. The EO dye molecule has one hydroxy group. As a side chain to the linear copolymer, the EO dye molecule is introduced.

For example, the EO dye molecule may crosslink a plurality of polymer chains to each other. For example, when the EO dye molecule has two reactive groups, the EO dye molecule may crosslink two polymer chains to each other. In the present embodiment, an EO polymer that has crosslinking formed by an EO dye molecule is also called "a crosslinked copolymer".

In the guest/host polymer, when the concentration of the guest molecules is high, the guest molecules (EO dye molecules) tend to aggregate. In the sidechain copolymer and the crosslinked copolymer, the EO dye molecules tend not to aggregate and thereby it seems to be easier to increase the concentration of the EO dye molecules.

<<(c) Addition of Second Liquid Material>>

Figure 7:
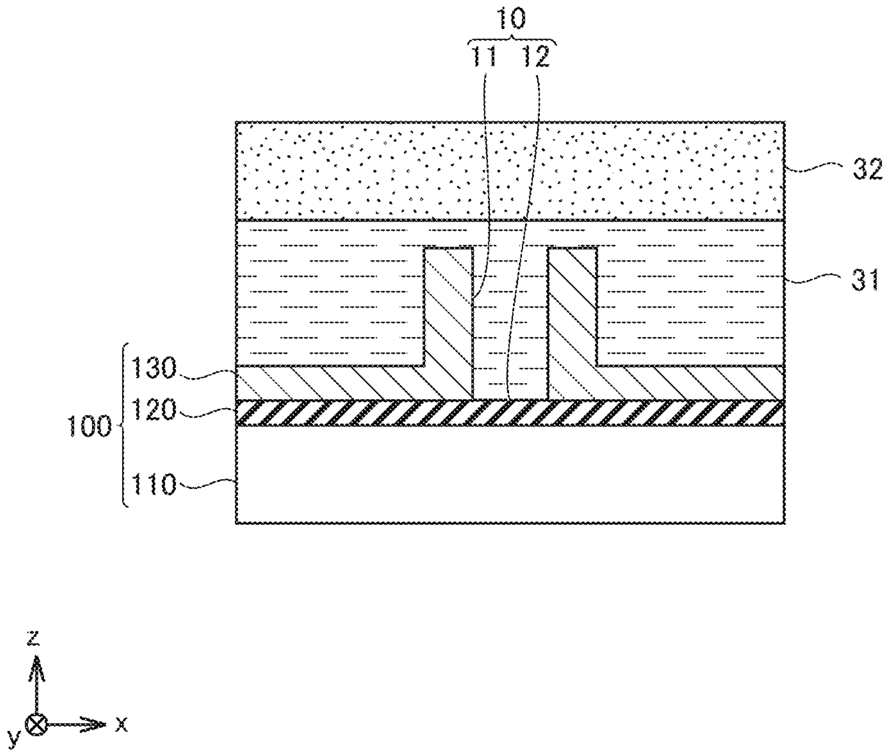
FIG. 7 is a fourth schematic cross-sectional view illustrating a process of producing a nonlinear optical device according to the present embodiment.
Figure 8:
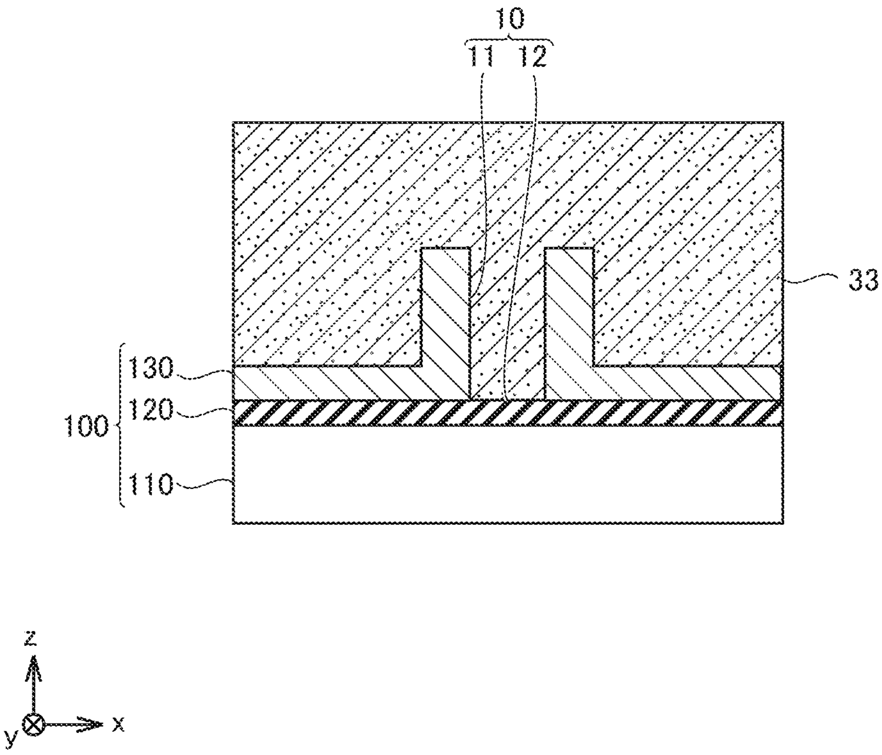
FIG. 8 is a fifth schematic cross-sectional view illustrating a process of producing a nonlinear optical device according to the present embodiment.

FIG. 7 is a fourth schematic cross-sectional view illustrating a process of producing a nonlinear optical device according to the present embodiment. FIG. 8 is a fifth schematic cross-sectional view illustrating a process of producing a nonlinear optical device according to the present embodiment. The method of producing an NLO device according to the present embodiment includes bringing a second liquid material 32 into contact with first liquid material 31 filled in recessed part 10 to prepare third liquid material 33.

Second liquid material 32 is brought into contact with first liquid material 31 by any method. For example, second liquid material 32 may be added dropwise to the liquid surface of first liquid material 31. For example, second liquid material 32 may be applied to the liquid surface of first liquid material 31. For example, second liquid material 32 may be sprayed to the liquid surface of first liquid material 31.

Second liquid material 32 includes a second solute and a second solvent. The second solute is dissolved in the second solvent. The second solute includes an NLO polymer. For example, the second solute may consist essentially of an NLO polymer. As long as it includes an NLO polymer, the second solute may further include other components. For example, the second solute may further include a surfactant as described above, and/or the like.

For example, when the first solute does not include an NLO polymer, the second solute and the first solute are different materials from each other. For example, when the first solute includes an NLO polymer, the second solute and the first solute may be different materials from each other, or may be the same material to each other.

For example, the second solvent may include a material that is described as the first solvent. For example, the second solvent may be a material that is different from the first solvent. For example, the second solvent may be the same material as the first solvent. When the second solute is the same material as the first solute and the second solvent is the same material as the first solvent, second liquid material 32 and first liquid material 31 are expected to be uniformly mixed with each other, for example.

Second liquid material 32 is a high-concentration solution. The concentration of the second solute in second liquid material 32 is higher than the concentration of the first solute in first liquid material 31. For example, the concentration of second liquid material 32 may be from 5 mass % to 40 mass %. For example, the concentration of second liquid material 32 may be from 10 mass % to 30 mass %. For example, the concentration of second liquid material 32 may be from 10 mass % to 20 mass %.

For example, the difference between the concentration of second liquid material 32 and the concentration of first liquid material 31 may be greater than 0 mass % and not greater than 40 mass %. For example, the difference between the concentration of second liquid material 32 and the concentration of first liquid material 31 may be from 5 mass % to 40 mass %. For example, the difference between the concentration of second liquid material 32 and the concentration of first liquid material 31 may be from 10 mass % to 20 mass %.

Second liquid material 32 may have a higher viscosity than first liquid material 31. For example, second liquid material 32 may have a viscosity from 2 mPa$ to 2500 mPa$. For example, second liquid material 32 may have a viscosity from 5 mPa$ to 2500 mPa$. For example, second liquid material 32 may have a viscosity from 10 mPa$ to 2500 mPa$. For example, second liquid material 32 may have a viscosity from 100 mPa$ to 2500 mPa$. For example, second liquid material 32 may have a viscosity from 1000 mPa$ to 2500 mPa$.

The solute diffuses from second liquid material 32 into first liquid material 31, and thereby third liquid material 33 is prepared. For facilitating the diffusion of the solute, the liquid material may be heated. H ere, the heating temperature is adjusted so as to avoid aggregation of the solute. For example, the solute may be allowed to diffuse in an environment at a temperature from 20° C. to 80° C. For example, the solute may be allowed to diffuse in an environment at a temperature from 30° C. to 60° C.

For example, the diffusion of the solute may be allowed to proceed in an environment at normal pressure, or in an environment under pressure.

The third liquid material may be prepared in such a manner that it is to have a substantially uniform concentration. For example, the solute concentration of third liquid material 33 may be from 5 mass % to 40 mass %. For example, the solute concentration of third liquid material 33 may be from 5 mass % to 20 mass %. For example, the solute concentration of third liquid material 33 may be from 5 mass % to 10 mass %.

<<(d) Solidification>>

Figure 9:
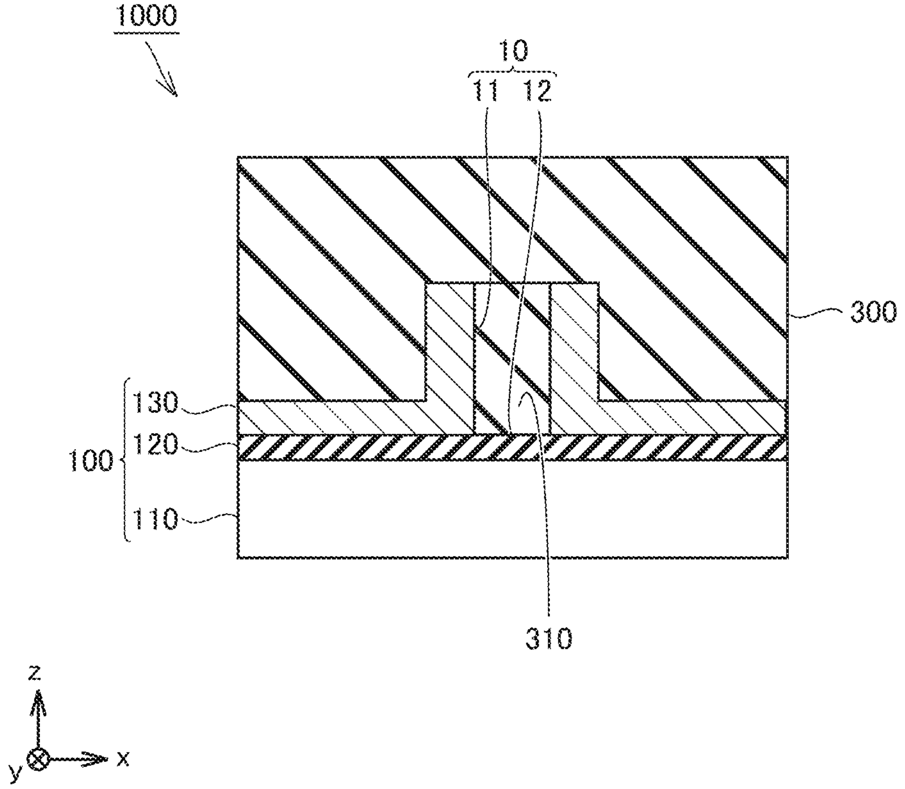
FIG. 9 is a sixth schematic cross-sectional view illustrating a process of producing a nonlinear optical device according to the present embodiment.

FIG. 9 is a sixth schematic cross-sectional view illustrating a process of producing a nonlinear optical device according to the present embodiment. The method of producing an NLO device according to the present embodiment includes solidifying third liquid material 33 to form an embedded portion 310. With the formation of embedded portion 310, an NLO device 1000 is completed.

As a result of solidification of third liquid material 33, polymer film 300 is formed. By a method that is not particularly limited, the first solvent and the second solvent may be removed from third liquid material 33. For example, at least one technique selected from the group consisting of air drying, drying under reduced pressure, spin drying, hot air drying, and infrared drying may be carried out.

Polymer film 300 includes embedded portion 310. Embedded portion 310 is embedded in recessed part 10. For example, a part of or the entirety of embedded portion 310 may form an optical waveguide. Embedded portion 310 according to the present embodiment may have a low void ratio. As a result, propagation loss in the optical waveguide is expected to be low.

Polymer film 300 (embedded portion 310) according to the present embodiment may have a smooth surface. For example, polymer film 300 may have a small surface roughness. For example, polymer film 300 may have a predetermined degree of surface smoothness. When polymer film 300 has a smooth surface, an NLO device that can be downsized may be provided.

<<(e) Poling>>

The method of producing an NLO device according to the present embodiment may further include subjecting embedded portion 310 to poling treatment, for example.

For example, when embedded portion 310 includes an EO polymer, embedded portion 310 is heated to a temperature that is near the glass transition temperature (T g) of the EO polymer. While heated, a predetermined degree of voltage is applied between electrodes 200. As a result, embedded portion 310 is positioned within an electric field. The EO dye molecules are oriented in the direction of the electric field. While the voltage is being applied, the EO polymer is cooled to room temperature. As a result, the EO dye molecules may be immobilized while the EO dye molecules are oriented.

EXAMPLES

In the following, examples according to the present disclosure (hereinafter also called "the present example") will be described. It should be noted that the scope of claims is not limited by the below description.

<Production of Nonlinear Optical Device>

By each of the following production methods No. 1 to No. 3, a device for evaluation purposes, which is hereinafter also called an evaluation device, is produced (an NLO device). The evaluation device according to the present example is a slot-waveguide-type optical modulator.

<No. 1>

<<(a) Formation of Recessed Part>>

As semiconductor substrate 100, an SOI substrate is prepared. By patterning by lithography as well as by RIE, recessed part 10 is formed. Recessed part 10 according to the present example is a slot that extends linearly. The width (w) of recessed part 10 is 134 nm. The depth (d) of recessed part 10 is 302 nm. Bottom portion 12 of recessed part 10 is positioned within BOX layer 120.

<<(b) Filling of First Liquid Material>>

First liquid material 31 according to the present example consists of a first solvent. The first solvent is cyclohexanone. The concentration of a first solute in first liquid material 31 is 0 mass %.

To a surface of semiconductor substrate 100, first liquid material 31 is added dropwise. After the dropwise addition, first liquid material 31 is left to stand for 10 minutes in an atmosphere under reduced pressure, and thereby first liquid material 31 is sufficiently degassed. Thus, recessed part 10 is filled with first liquid material 31. After filling, with the use of a spin coater, semiconductor substrate 100 is spun at 500 rpm for 3 seconds. By this, an excess amount of first liquid material 31 is removed.

<<(c) Addition of Second Liquid Material>>

As a second solute, an EO polymer is prepared. The EO polymer is a crosslinked copolymer. As a second solvent, cyclohexanone is prepared. The second solute is dissolved in the second solvent, and thereby second liquid material 32 is prepared. The concentration of the second solvent in second liquid material 32 is 16 mass %. The concentration of the second solute in the second liquid material 32 (16 mass %) is higher than the concentration of the first solute in first liquid material 31 (0 mass %).

Second liquid material 32 is added dropwise to first liquid material 31. That is, second liquid material 32 is brought into contact with first liquid material 31. The second solute (EO polymer) diffuses in an environment at room temperature, and thereby third liquid material 33 is prepared. Third liquid material 33 is prepared so that it has a substantially uniform concentration.

<<(d) Solidification>>

After the dropwise addition of second liquid material 32, with the use of a spin coater, semiconductor substrate 100 is spun at 1500 rpm for 60 seconds. This allows third liquid material 33 to spread substantially uniformly on the surface of semiconductor substrate 100 and, also, the first solvent and the second solvent to be volatilized. As a result, the second solute precipitates inside recessed part 10. That is, third liquid material 33 is solidified. Thus, polymer film 300 is formed. The part of polymer film 300 that has entered into recessed part 10 forms embedded portion 310. Polymer film 300 is further heated to a temperature near the glass transition temperature ($T_g$) of the EO polymer and subjected to heat treatment for one hour in an atmosphere under reduced pressure, and thus the remaining first solvent and the remaining second solvent are removed.

<<(e) Poling>>

Embedded portion 310 is heated to a temperature near the glass transition temperature ($T_g$) of the EO polymer. In the heated state, embedded portion 310 is positioned within an electric field. Subsequently, while the electric field is maintained, embedded portion 310 is cooled. In this manner, an evaluation device is produced.

<No. 2>

Figure 10:
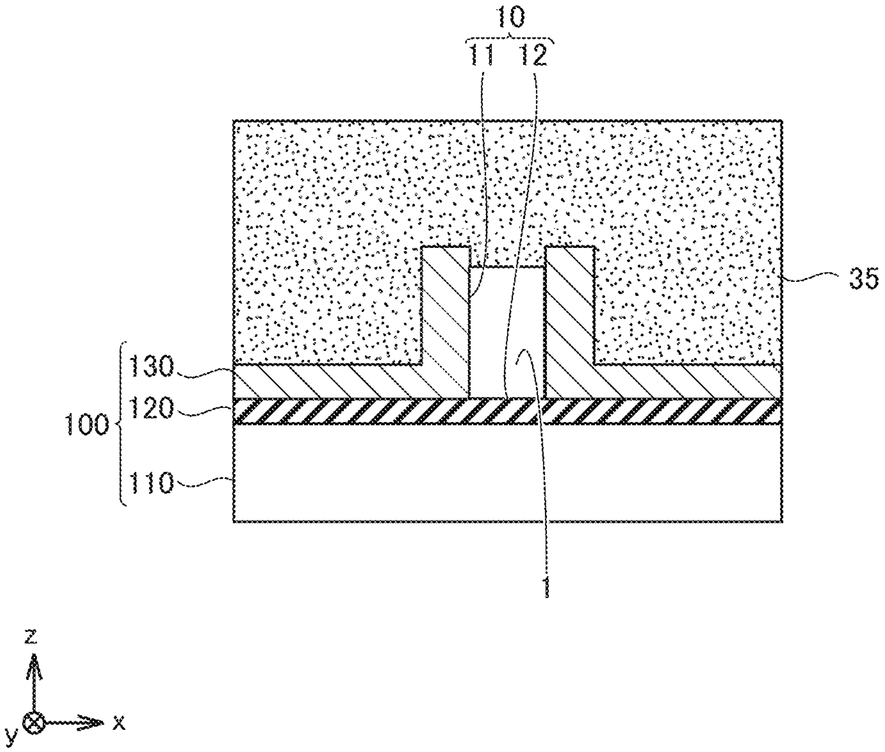
FIG. 10 is a first schematic cross-sectional view illustrating production process No. 2.

FIG. 10 is a first schematic cross-sectional view illustrating production process No. 2. As in the same manner as in No. 1, semiconductor substrate 100 having recessed part 10 is prepared. A polymer solution 35 is prepared. The solvent in polymer solution 35 is cyclohexanone. The solute is the same EO polymer as in No. 1. The concentration of polymer solution 35 is 16 mass %.

With the use of a spin coater, in an atmosphere at normal pressure, polymer solution 35 is applied to a surface of semiconductor substrate 100. Thus, recessed part 10 is filled with polymer solution 35. It is expected that air bubbles 1 tend not to come out from the recessed part 10 due to the normal-pressure atmosphere.

Figure 11:
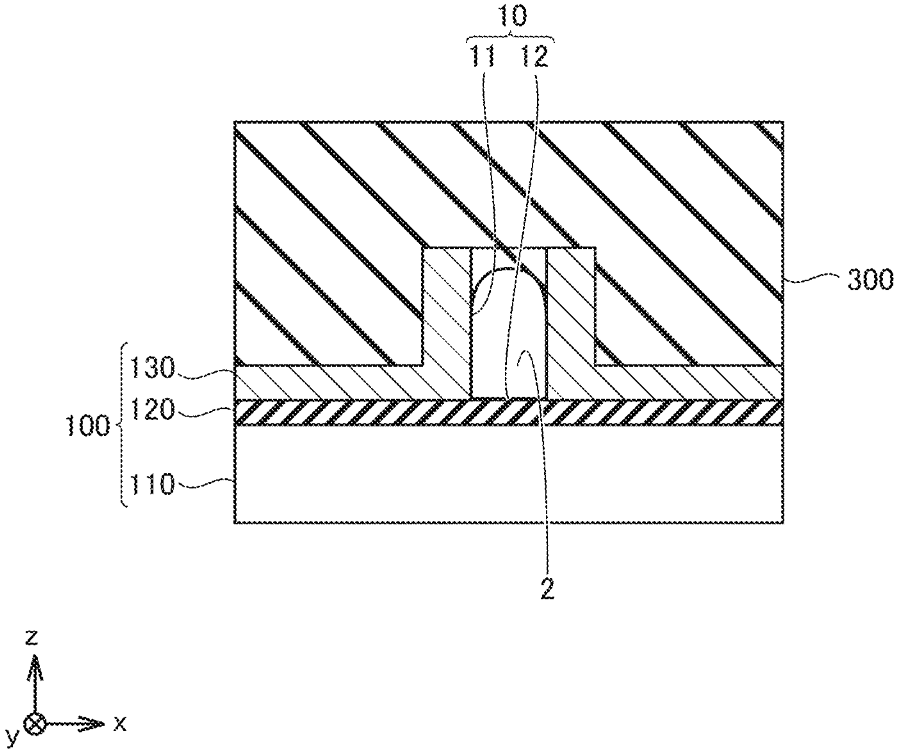
FIG. 11 is a second schematic cross-sectional view illustrating production process No. 2.

FIG. 11 is a second schematic cross-sectional view illustrating production process No. 2. Polymer solution 35 is solidified, and thereby polymer film 300 is formed. It is expected that avoid 2 remains in embedded portion 310. After the formation of polymer film 300, the same poling treatment as in No. 1 is carried out.

<No. 3>

Figure 12:
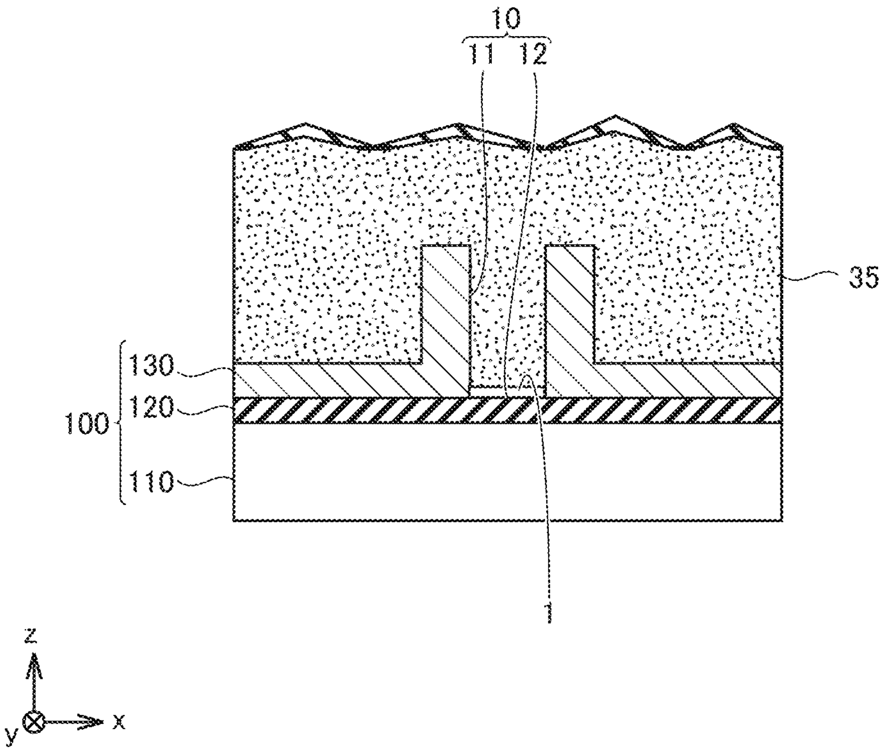
FIG. 12 is a schematic cross-sectional view illustrating production process No. 3.

FIG. 12 is a schematic cross-sectional view illustrating production process No. 3. In an environment under reduced pressure, application and filling of polymer solution 35 are carried out. It is expected that, due to the reduced pressure degassing, air bubbles 1 are decreased as compared to in No. 2. However, it is also expected that, due to surface solidification of polymer solution 35, the surface of polymer film 300 can become irregular. After the formation of polymer film 300, the same poling treatment as in No. 1 is carried out.

<Evaluation>

Above semiconductor substrate 100, a first near-infrared camera is placed. With this first near-infrared camera, an image of light propagation streak generated by scattering of light propagating through embedded portion 310 is taken.

Figure 13:
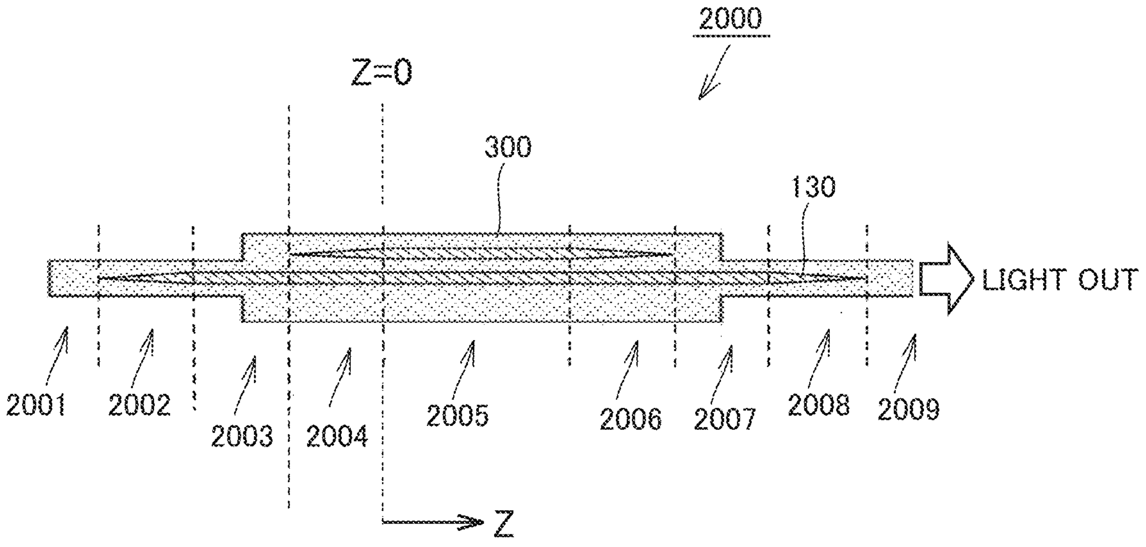
FIG. 13 is a schematic top view of an evaluation device.
Figure 14:
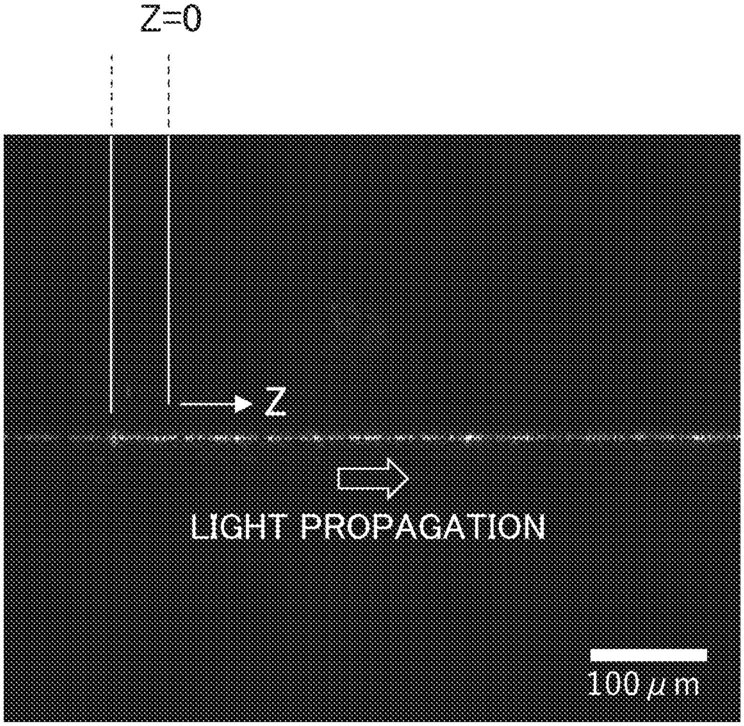
FIG. 14 is an example of measurement of a light propagation streak image for No. 2.
Figure 15:
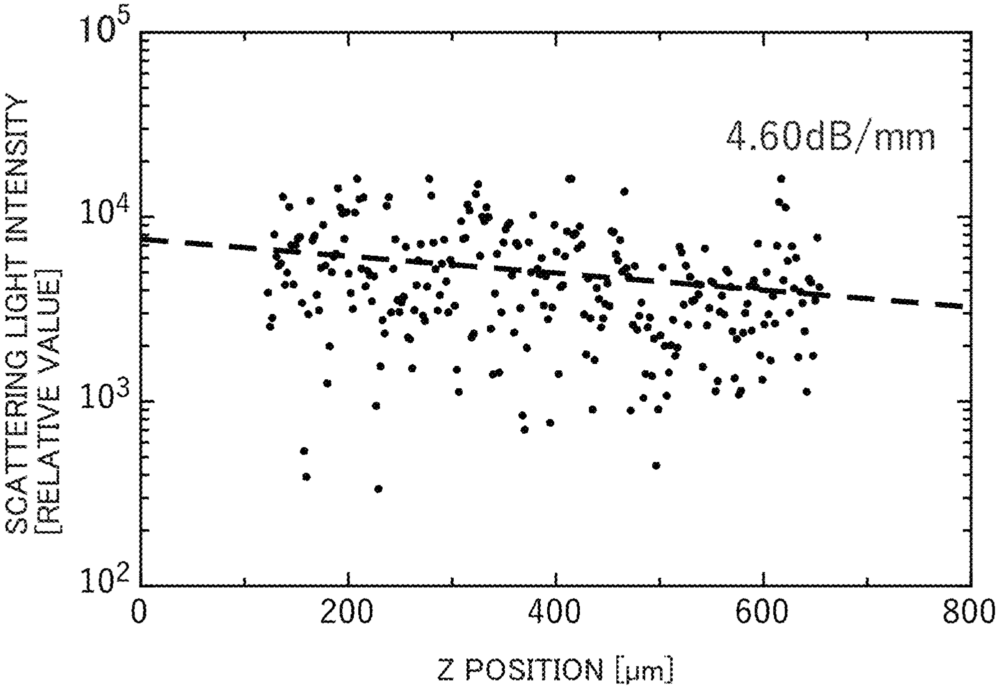
FIG. 15 is an example of calculation of propagation loss for No. 2.

Each of FIG. 13 to FIG. 15 illustrates an example of propagation loss measurement. FIG. 13 is a schematic top view of an evaluation device. An evaluation device 2000 is symmetric. Evaluation device 2000 is constituted with a first polymer waveguide 2001, a first spot-size converter 2002, a first Si strip waveguide 2003, a second spot-size converter 2004, a Si slot waveguide 2005, a third spot-size converter 2006, a second Si strip waveguide 2007, a fourth spot-size converter 2008, and a second polymer waveguide 2009, connected in this order. Si slot waveguide 2005 has a length of 1736≈m.

FIG. 14 is a light propagation streak image for No. 2. The light propagation streak image in FIG. 14 is taken in Si slot waveguide 2005 in FIG. 13. As shown in FIG. 15, scattering light intensity (relative value) of the light propagation streak image is plotted relative to the position (Z) in Si slot waveguide 2005. By a least square method, the plots are approximated to an exponential function to determine propagation loss.

In the direction of an end face of semiconductor substrate 100, a second near-infrared camera is placed. With this second near-infrared camera, a light output near-field pattern is captured. From values obtained with a light attenuator at a light intensity equivalent to the light output near-field pattern, light output (relative value) is calculated.

Evaluation device 2000 is cut in a direction that crosses Si slot waveguide 2005. The cut face is examined with an SEM to see if there is a void in embedded portion 310. Five or more cut faces are examined to see if each of them has a void. By the following formula, the void ratio is calculated.

Void ratio (%)={(Number of cut faces with void)/(Number of cut faces examined)}B100

Results

Figure 16:
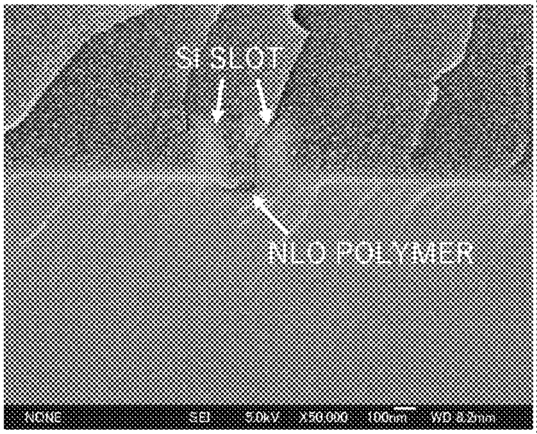
FIG. 16 gives results of evaluation for No. 1 to No. 3.
Figure 16:
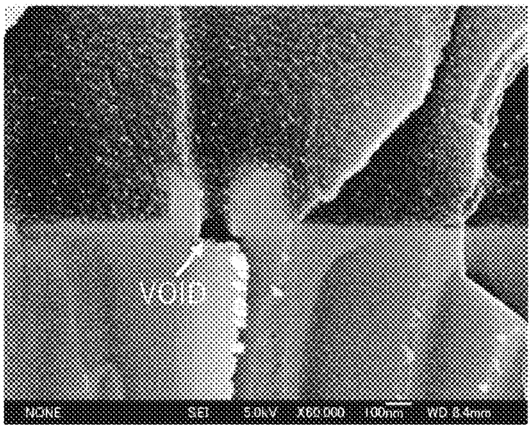
Figure 16:
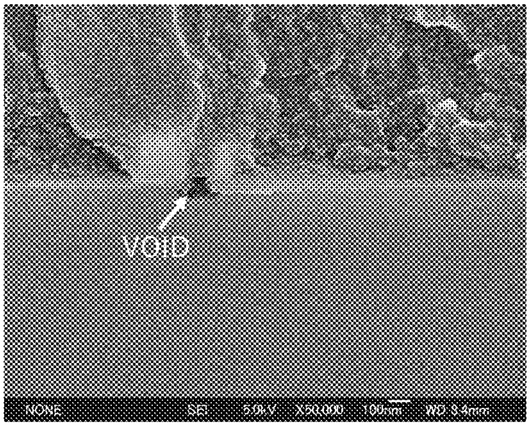

FIG. 16 gives results of evaluation for No. 1 to No. 3.

The cross-sectional SEM images are examined for voids. Such a void is where no polymer is filled on bottom portion 12 of recessed part 10.

In the cross-sectional SEM image for No. 2, a void is frequently observed. The void ratio in No. 2 is 71%. It seems that embedded portion 310 has many remaining voids. It has the greatest propagation loss and the lowest light output.

In the cross-sectional SEM image for No. 3, voids are decreased as compared to No. 2. The void ratio in No. 3 is 9%. It seems that voids are decreased due to the reduced pressure degassing. However, even though the number is small, voids are observed, indicating that a small amount of voids still remain. In No. 3, propagation loss is decreased and light output is increased as compared to No. 2. Another observation is that, in No. 3, due to surface solidification of polymer solution 35, the surface of polymer film 300 (embedded portion 310) is irregular.

In the cross-sectional SEM image for No. 1, no void is observed. The void ratio in No. 1 is 0%. The propagation loss in No. 1 is smaller than the propagation loss in No. 2 and No. 3. The light output in No. 1 is higher than the light output in No. 2 and No. 3. It seems that voids are noticeably decreased because first liquid material 31 can easily enter into recessed part 10. In No. 1, it seems that voids are substantially completely removed. In No. 1, the surface of polymer film 300 may be smooth. It may be because surface solidification of first liquid material 31 tends not to occur.

ASPECT

In the present disclosure, NLO devices according to the following <<Aspect 1>> to <<Aspect 3>> may also be provided.

Aspect 1

A nonlinear optical device comprising:
a semiconductor substrate; and
a polymer film, wherein
a surface of the semiconductor substrate has a recessed part formed therein,
the recessed part extends along the surface of the semiconductor substrate,
the polymer film covers at least part of the surface of the semiconductor substrate,
the polymer film includes an embedded portion,
the embedded portion is embedded in the recessed part,
the embedded portion includes a nonlinear optical polymer, and
propagation loss for the embedded portion is equal to or less than a predetermined value.

Aspect 2

The nonlinear optical device according to <<Aspect 1>>, wherein the embedded portion has a void ratio equal to or less than a predetermined value.

Aspect 3

The nonlinear optical device according to <<Aspect 1>> or <<Aspect 2>>, wherein the polymer film has a surface roughness equal to or less than a predetermined value.

The present embodiment and the present example are illustrative in any respect. The present embodiment and the present example are non-restrictive. For example, it is expected that certain configurations of the present embodiments and the present examples can be optionally combined.

The technical scope defined by the terms of the claims encompasses any modifications within the meaning equivalent to the terms of the claims. The technical scope defined by the terms of the claims also encompasses any modifications within the scope equivalent to the terms of the claims.

REFERENCE SIGNS LIST

1 air bubble; 2 void; 10 recessed part; 11 side wall; 12 bottom portion; 31 first liquid material; 32 second liquid material; 33 third liquid material; 35 polymer solution; 100 semiconductor substrate; 101 surface; 110 Si substrate; 120 BOX layer; 130 Si active layer; 131 first doped region; 132 second doped region; 200 electrode; 300 polymer film; 310 embedded portion; 1000 nonlinear optical device; 2000 evaluation device; 2001 first polymer waveguide; 2002 first spot-size converter; 2003 first Si strip waveguide; 2004 second spot-size converter; 2005 Si slot waveguide; 2006 third spot-size converter; 2007 second Si strip waveguide; 2008 fourth spot-size converter; 2009 second polymer waveguide.

The invention claimed is:

1. A method of producing a nonlinear optical device, the method comprising:
filling a first liquid material into the recessed part in an environment under reduced pressure;
in the recessed part to prepare a third liquid material; and
solidifying the third liquid material to form an embedded portion, wherein
the first liquid material includes a first solute and a first solvent, or the first liquid material consists of the first solvent,
the second liquid material includes a second solute and a second solvent,
the second solute includes a nonlinear optical polymer, and
a concentration of the second solute in the second liquid material is higher than a concentration of the first solute in the first liquid material.

2. The method of producing a nonlinear optical device according to claim 1, wherein the first solute includes the nonlinear optical polymer.

3. The method of producing a nonlinear optical device according to claim 1, wherein at least part of the recessed part is formed in such a manner that it extends linearly along the surface of the semiconductor substrate.

4. The method of producing a nonlinear optical device according to claim 1, wherein a ratio of a depth of the recessed part to a width of the recessed part is from 0.5 to 12.

5. The method of producing a nonlinear optical device according to claim 1, wherein the width of the recessed part is 170 nm or less.

6. The method of producing a nonlinear optical device according to claim 1, wherein
the concentration of the first solute in the first liquid material is from 0 mass % to 35 mass %, and
the concentration of the second solute in the second liquid material is from 5 mass % to 40 mass %.

7. The method of producing a nonlinear optical device according to claim 1, wherein the nonlinear optical polymer includes a structure represented by the following formula (I):

[Chemical 1]

(I)

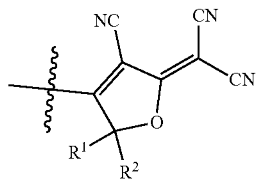

where each of $R^1$ and $R^2$ is independently a hydrogen atom, an alkyl group, an alkenyl group, a cycloalkyl group, a cycloalkenyl group, an alkoxy group, a haloalkyl group, an aryl group, a hydroxy group, a thiol group, or an amino group.

8. The method of producing a nonlinear optical device according to claim 1, wherein each of the first solvent and the second solvent includes at least one selected from the group consisting of acetone, methyl ethyl ketone, cyclopentanone, cyclohexanone, cycloheptanone, acetylacetone, methyl amyl ketone, n-methylketone, γ-butyrolactone, tetrahydrofuran, chloroform, dibromomethane, 1,2-dichloroethane, 1,2-dibromoethane, 1,1,2-trichloroethane, 1,1,2,2-tetrachloroethane, 1,1,2-tribromoethane, 1,1,2,2-tetrabromoethane, ethyl acetate, butyl acetate, methyl lactate, ethyl lactate, butyl lactate, propylene glycol methyl ether, propylene glycol monomethyl ether acetate, and ethyl cellosolve acetate.

9. The method of producing a nonlinear optical device according to claim 1, wherein
the second solvent is the same material as the first solvent, and
the second solute is the same material as the first solute.

10. The method of producing a nonlinear optical device according to claim 1, wherein the first solute includes the nonlinear optical polymer, at least part of the recessed part is formed in such a manner that it extends linearly along the surface of the semiconductor substrate, the first liquid material is filled into the recessed part in an atmosphere under reduced pressure, a ratio of a depth of the recessed part to a width of the recessed part is from 0.5 to 12, the width of the recessed part is 170 nm or less, a concentration of the first solute in the first liquid material is from 0 mass % to 35 mass %, and a concentration of the second solute in the second liquid material is from 5 as % to 40 mass %.

* * * * *